(12) United States Patent
Dinca

(10) Patent No.: US 7,786,428 B2
(45) Date of Patent: Aug. 31, 2010

(54) REMOTE OPTICAL CONTROL OF ELECTRICAL CIRCUITS HAVING A CONTROL MODULE WITH A MECHANICAL SWITCH AND A LIGHT MAGNIFYING LENS

(76) Inventor: George Dinca, 23 McCoy Court, Richmond Hill, Ontario (CA) L4S 1B6

( * ) Notice: Subject to any disclaimer, the term of this patent is extended or adjusted under 35 U.S.C. 154(b) by 566 days.

(21) Appl. No.: 11/849,105

(22) Filed: Aug. 31, 2007

(65) Prior Publication Data
US 2009/0060513 A1 Mar. 5, 2009

(51) Int. Cl.
*G01J 1/36* (2006.01)
(52) U.S. Cl. ................... 250/227.22; 250/551
(58) Field of Classification Search ............ 250/227.22, 250/227.21, 227.14, 227.11, 551, 554; 200/61.02
See application file for complete search history.

(56) References Cited
U.S. PATENT DOCUMENTS

| | | | |
|---|---|---|---|
| 3,937,952 A * | 2/1976 | Ripley et al. ........... | 250/227.22 |
| 4,223,217 A | 9/1980 | Bongard | |
| 4,503,994 A | 3/1985 | Pyle | |
| 4,894,530 A | 1/1990 | Kitchen | |
| 5,867,403 A | 2/1999 | Sasnett | |

FOREIGN PATENT DOCUMENTS

CA  1184240  5/1982

* cited by examiner

*Primary Examiner*—Que T Le

(57) ABSTRACT

An optical controlling circuit and an electrical controlled circuit such as a motor control circuit are interconnected by an electro-optic interface. A passive optical switch located in the optical circuit at a position remote from the electrical circuit is physically actuated to generate a change in optical transmission state of the optical circuit. At the electro-optic interface, the change in optical transmission state of the optical circuit is detected and triggers a change in the electrical transmission state of the electric circuit. Embodied as STOP and START pushbuttons, a pair of such passive optical switches at a position remote from the electric circuit reduces the risk that actuating motor control circuits and the like will cause arcing and, in hazardous environments, explosion.

12 Claims, 5 Drawing Sheets

SECTION III

SCALE 2:1

SCALE 2:1

REMOTE OPTICAL CONTROL OF ELECTRICAL CIRCUITS HAVING A CONTROL MODULE WITH A MECHANICAL SWITCH AND A LIGHT MAGNIFYING LENS

BACKGROUND

The present invention relates to safe remote control of electrical circuits such as circuits driving electric motors, electric heaters and the like.

It is known to use an electrical starter motor to remotely start and stop a primary motor. Typically, remote actuation is achieved through an electrical circuit having a STOP/START actuator at the remote site and an electrical circuit connecting the STOP/START actuator to a motor energizing circuit at the primary motor site. To enable rapid control of the primary motor, the STOP/START actuator may consist of one or more pushbuttons. When installed in a hazardous area where there is a risk of explosive gases, the remote START/STOP actuator is typically enclosed in a sealed explosion-proof enclosure so as to reduce the chance of an explosion occurring if any spark results from arcing between switch contacts.

While this arrangement may be satisfactory in some environments, further improvements are possible to improve safety and cost.

SUMMARY

In accordance with the present invention, there is provided a control system for electrical apparatus, comprising: an electro-optic interface having a first optical transmitter for producing an optical output signal in response to an electrical input signal, an optical receiver for producing an output electric signal in response to an optical input signal, and a second optical transmitter for producing an optical output signal in the visible range of light in response to an electric input signal; a first optical path extending from said second optical transmitter to said optical receiver through a control module and a second optical path extending from said second optical transmitter to said control module, said control module comprising a mechanical switch arranged for selectively interrupting said first optical path and a light magnifying lens terminating said second optical path.

In accordance with another aspect of the present invention, there is provided a method of controlling an electrical system with an optical system, comprising: at a first station connected to said electrical system, continuously supplying light to a control station on a first optical path and supplying light to said control station on a second optical path only where a given component of said electrical system is activated.

Other features and advantages will be apparent from following description in conjunction with the drawings.

BRIEF DESCRIPTION OF THE DRAWINGS

In the figures which illustrate an exemplary embodiment of this invention.

DETAILED DESCRIPTION

Figure 1:
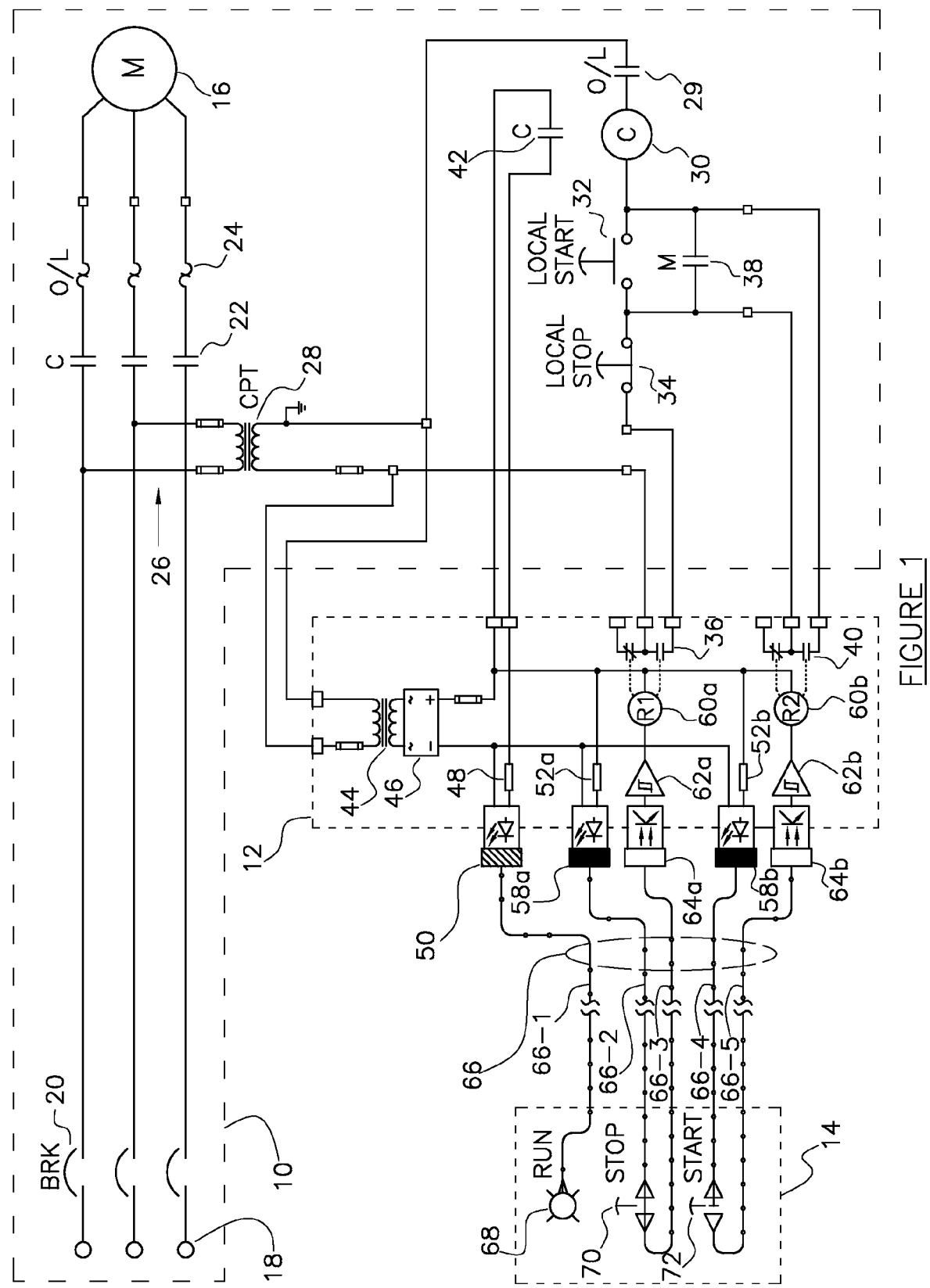
FIG. 1 is a schematic diagram of an optically controlled remote motor starter arrangement in accordance with an embodiment of the present invention.

FIG. 1 is a schematic diagram of an optically controlled remote motor starter arrangement in accordance with an embodiment of the present invention. The arrangement includes a motor and starter circuit 10, an electro-optic interface module 12 and a pushbutton control station 14. Typically, the interface module 12 is in a protected area whereas the pushbutton control station 14 may be positioned in a hazardous area.

The motor and starter circuit 10 has a motor 16 connected to the mains 18 through breaker 20, starter contacts 22, and overload relay 24. Taps 26 from the mains supply the primary side of a step-down control power transformer 28. The secondary side of the transformer provides a first current loop through a normally closed overload contact 29, starter contactor 30, local start button 32, local stop button 34 and an interface contact 36 of the interface module 12. The secondary side of the transformer 28 also provides a second current loop through overload contact 29, starter contactor 30, a parallel path through either seal-in starter contact 38 or interface contact 40, and interface contact 36. The motor and starter circuit 10 also has a starter contact 42 that is connected to interface module 12.

The interface module 12 has a step-down transformer 44 with a primary side connected to the secondary side of transformer 28 of motor and starter circuit 10. The secondary side of transformer 44 powers an AC/DC converter 46. The DC output of converter 46 is incorporated in a first current loop including starter contact 42 of motor and starter circuit 10 and a current limiting resistor 48 and a high intensity optical transmitter 50 emitting at a visible wavelength (e.g. 650 nm). The DC output is also incorporated in a second current loop which loop has a parallel path through a first current limiting resistor 52a and a first infrared (e.g., 850 nm) transmitter 58a and through a second current limiting resistor 52b and a second infrared (e.g., 850 nm) transmitter 58b. Transmitters 58a, 58b may be, for example, OPTEK type OPF1414 transmitters. The positive side of the DC output is also connected to the serial connection of a first DC relay 60a, (noise cancelling) Schmitt trigger 62a, and receiver 64a and a second DC relay 60b, (noise cancelling) Schmitt trigger 62b, and receiver 64b. Receivers 64a, 64b may be, for example, OPTEK type OPF2416 receivers. An optical cable 66 connects the interface module 12 to pushbutton control station 14. DC relay 60a controls interface module contact 40 and DC relay 60b controls interface module contact 36.

The pushbutton control station 14 has an indicator light 68 connected to high intensity transmitter 50 of interface module 12 through optical fibre 66-1 of cable 66. Station 14 also has a STOP pushbutton 70 connected in an optical loop between transmitter 58a and receiver 64a of the interface module 12 by optical fibres 66-2, 66-3 of cable 66 and a START pushbutton 72 connected in an optical loop between transmitter 58b and receiver 64b of the interface module 12 by further optical fibres 66-4, 66-5 of cable 66.

Station 14 is non-active, that is, it has no components which use electrical power.

Figure 2:
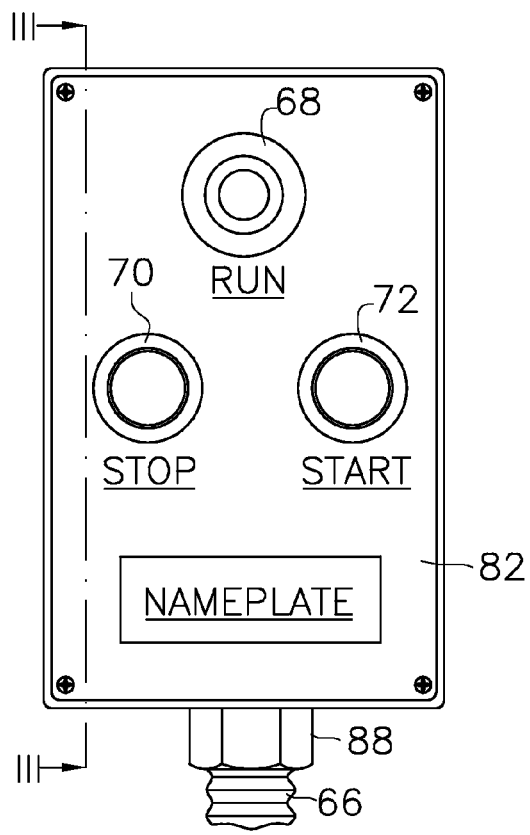
FIG. 2 is a front view of a pushbutton control station in accordance with an embodiment of the present invention.
Figure 3:
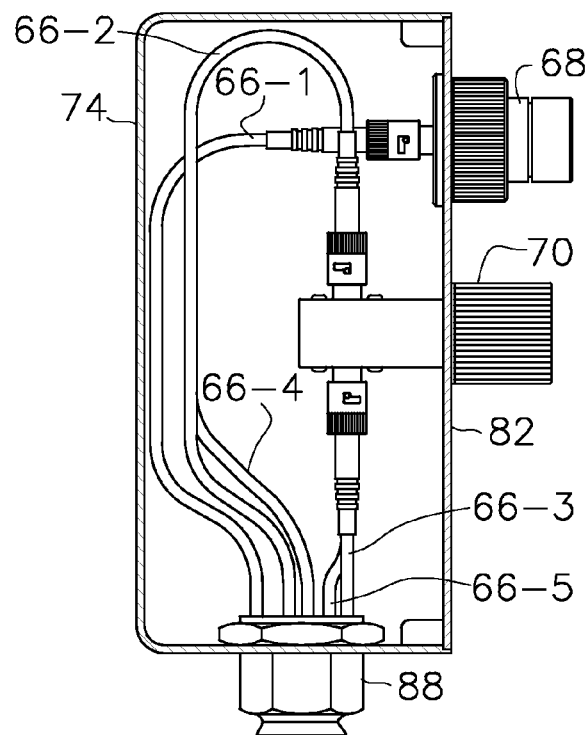
FIG. 3 is a vertical sectional view along the lines III-III of FIG. 2.

The pushbutton control station 14, shown in front elevation in FIG. 2 and in sectional view in FIG. 3, is typically installed in the field and has a weatherproof enclosure 74 rated at a National Electrical Manufacturers Association 3R, 4 or 4X rating. The enclosure 74 houses optical STOP and START pushbuttons 70, 72 and fiber optic indicator light 68, all of which are designed to limit the ingress of dust and other substances to enable deployment in harsh industrial environments. The enclosure has a front panel 82 at which the START and STOP pushbuttons 70, 72 and the indicator light 68 are accessible. Optical cable 66 enters the bottom of the enclosure 74 via a cable connector 88. The enclosure 74 is dimensioned so as to accommodate optical fibers 66-1 to 66-5 of cable 66 without their being subjected to such a tight bending radius as to cause light loss or damage. The fiber optic cable 66 is a standard cable adapted to be deployed in outdoor installations on cable trays, duct banks or to be directly buried (not shown). In one embodiment of the invention, the cable has six multimode, step-index optical fibers having a 125 micron diameter cladding and a 62.5 diameter micron core, the fibers being contained within interlocked steel armoured, tight buffered, single jacket Canadian Standards Association rated FT-4 cable.

Figure 4:
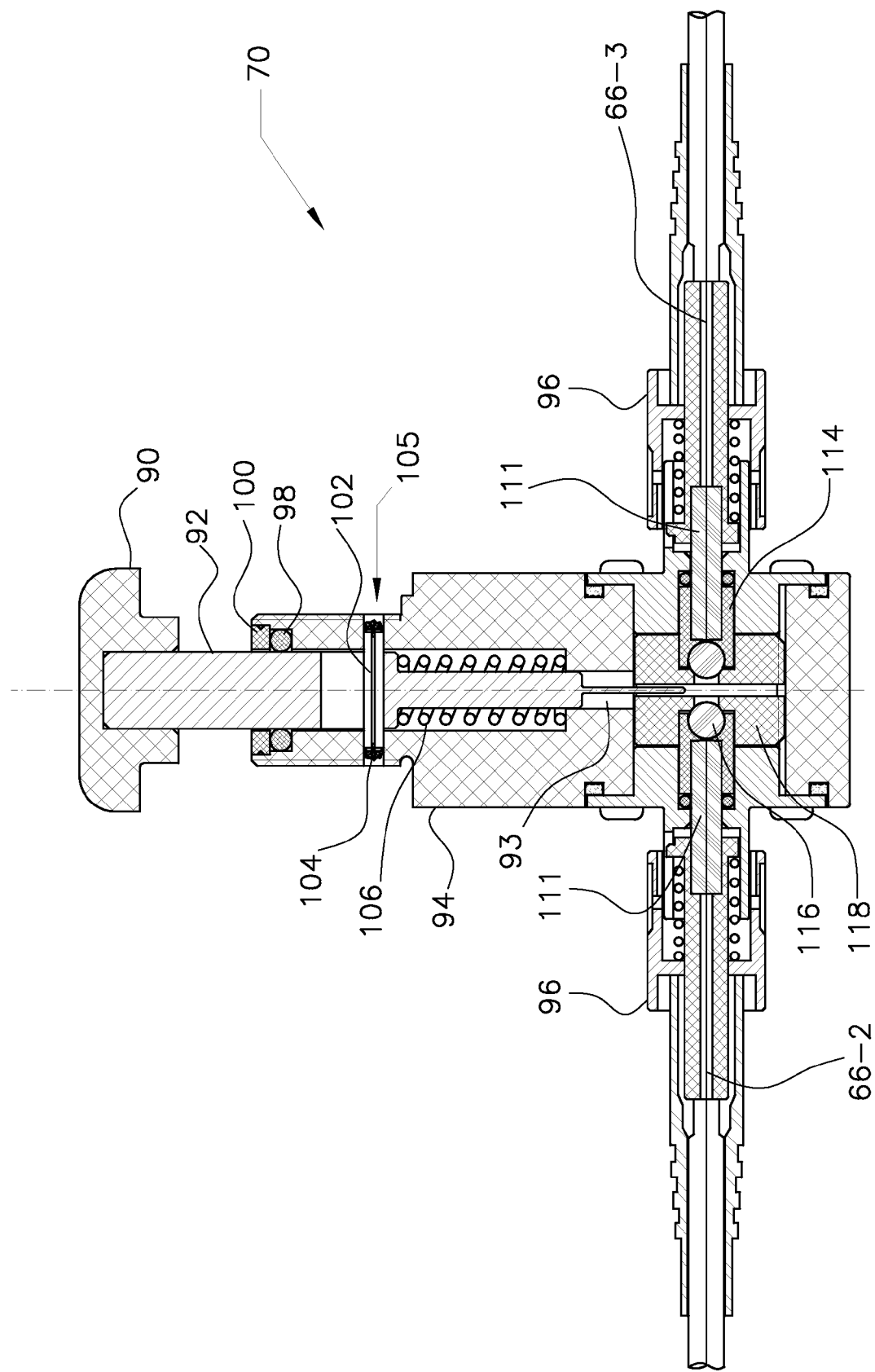
FIG. 4 is a sectional view through a STOP pushbutton made in accordance with an embodiment of the present invention.

Referring to the sectional view of FIG. 4, the optical STOP pushbutton 70 has a cap 90 and a plunger 92 and is mounted for reciprocal motion within a housing 94. The plunger 92 is shown in elevation view in FIG. 6A. Housing 94 is mounted to an optical connector shown generally at 96. An O-ring seal 98 is held in place around the plunger 92 by a press fit installed washer 100. A spring pin 102, sealed at its ends with silicone plugs 104 to prevent ingress of dust, is mounted in a bore 105 through the housing 94. The spring pin 102 prevents the plunger 92 from rotating and limits the plunger's travel. A compression spring 106 mounted around a medial portion of the plunger 92 is operable to bias the plunger back to a home position after it is depressed. The plunger terminates in a solid blade 93. The surfaces of the blade 93 are rough and black to minimize light back reflection into the fiber. The optical connector 96 is of a known ST connector design. Each of the fibers 66-2 and 66-3 connected to the STOP push button has an end portion mounted within a ferrule 111. Split sleeves 114 align each of the ferrules 111 with a respective ball lens 116. A centre split sleeve 118 aligns the two split sleeves 114. At each side of the central connector section, O-rings seal around the respective fibers 66-2, 66-3 to prevent ingress of dust and other contaminants into the central connector section. Although FIG. 4 shows the STOP button in a vertical orientation, it can be mounted in any convenient orientation.

Figure 5A:
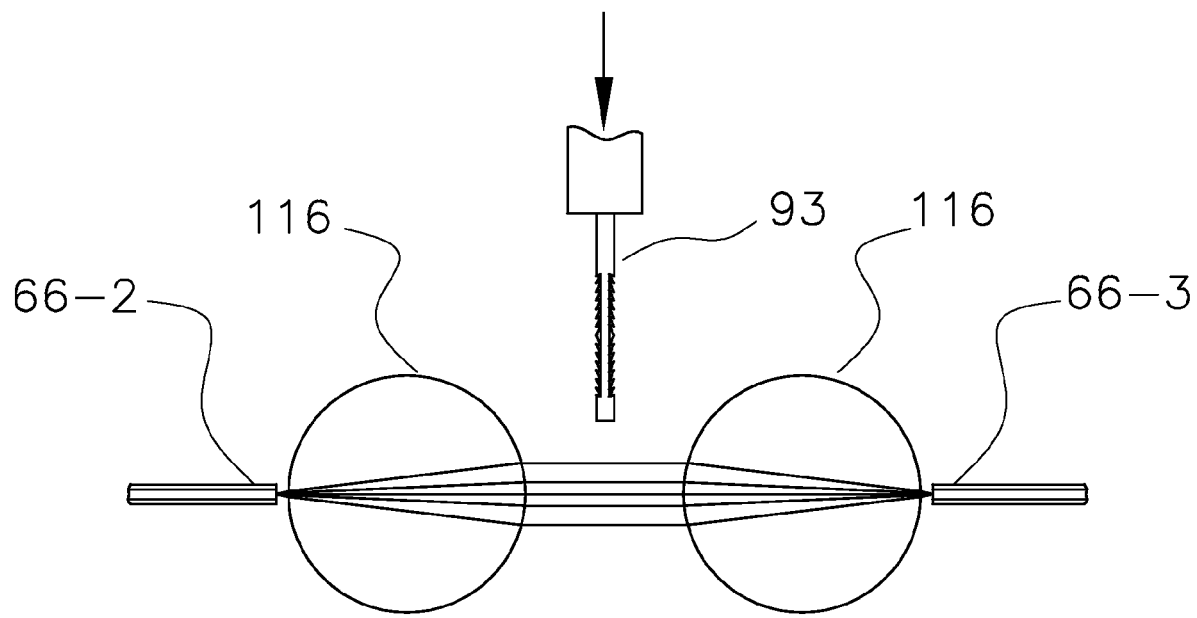
FIGS. 5A and 5B are diagrams showing, respectively, an optical switching area of the STOP pushbutton when not actuated and the STOP pushbutton when actuated.
Figure 5B:
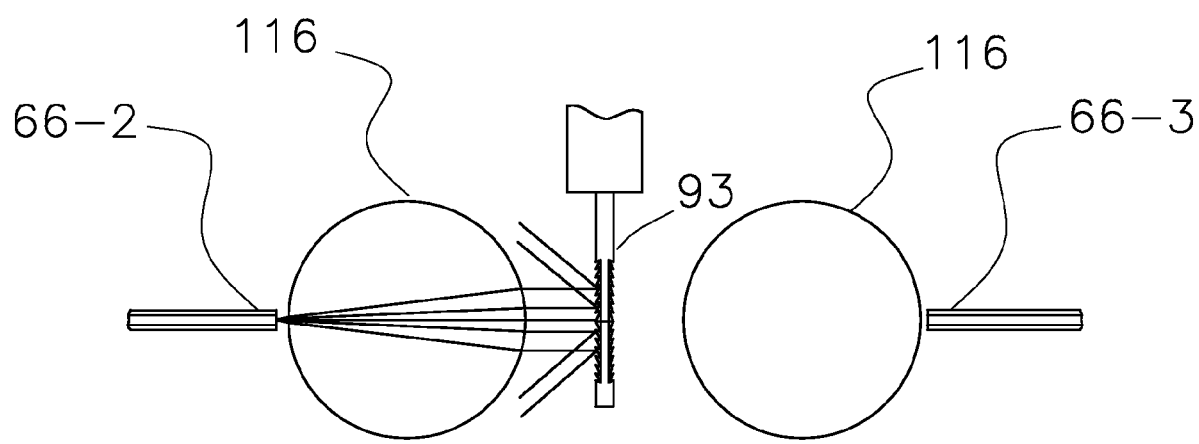

With this arrangement, as illustrated in FIG. 5A, if plunger 92 is in its rest position (i.e., it has not been depressed by an operator), blade 93 is not interposed in the light path between ball lenses 116. Consequently, light emitted from the end of the transmitter fiber 66-2 is collimated at the ball lens 116 on one side of the ST connector and is then refocused by an identical ball lens 116 into the receiver fiber 66-3 at the other side of the ST connector. On the other hand, if plunger is pressed by an operator, as seen in FIG. 5B, blade 93 blocks the light path between the ball lenses.

The optical START button is identical to the just described STOP button with one exception: the blade of the plunger of the START button is longer than the blade of the STOP button and it has an aperture. The plunger of the START button is depicted in FIG. 6B. Turing to FIG. 6B, it will be seen that the plunger 112 of the START button has a blade 113 with an aperture 115. By comparing FIG. 6A with FIG. 6B, it will be seen that blade 113 of the START button is longer than blade 93 of the STOP button. In consequence of the described configuration of the START pushbutton, the START button is, similarly to the STOP button, normally biased by a corresponding compression spring (not shown) to a retracted position. In its retracted position, the longer blade of the START button bars the passage of light from the transmitter fiber to the receiver fiber. However, by pressing the START pushbutton, the aperture 115 becomes aligned with the light beam emitted from the transmitter fiber so that the light passes from the transmitter fiber into the receiver fiber.

Figure 7:
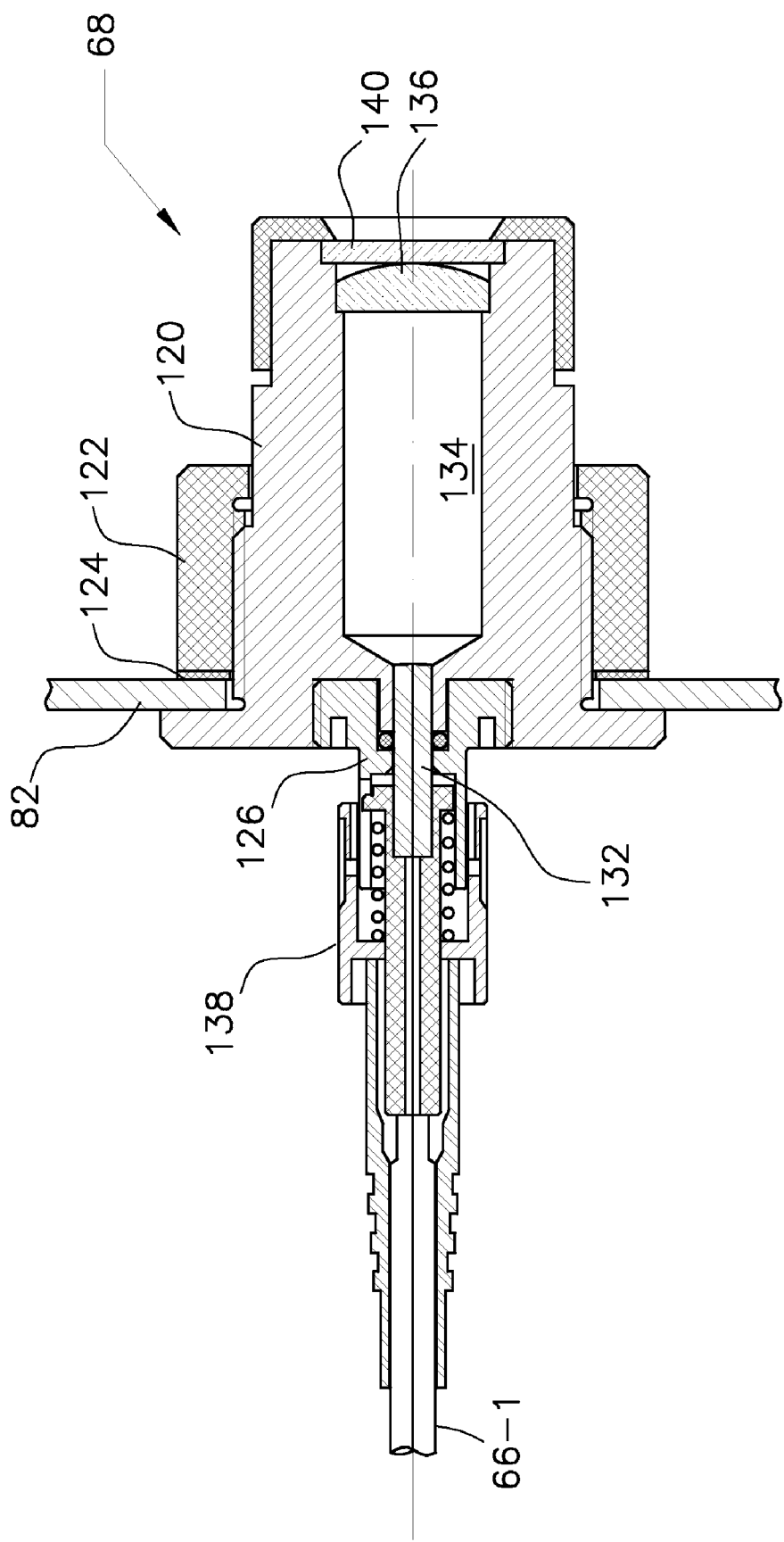
FIG. 7 is a sectional view through a fiber optic indicator light made in accordance with an embodiment of the present invention.

Turning to FIG. 7, the fiber optic indicator light 68 has a body 120. A locknut 122 fixes the body 120 in the front panel 82 of the enclosure 74 (FIG. 3) with a sealing gasket 124 preventing ingress of dust and other contaminants. A standard ST female fiber optic connector 126 is mounted in sealing engagement with body 120. Optical fiber 66-1 is clamped in place by the elements of the ST male connector including a ferrule 132 surrounding an end portion of the fiber 66-1. The end of the fiber 66-1 faces one end of a hollow cylindrical chamber 134 axially aligned with the fiber and formed in body 120. The opposite end of chamber 134 is open and receives a plano-convex lens 136. The lens 136 is dimensioned and positioned so that its focal point is located on the end face of the optical fiber 66-1. A diffuser glass 140 is mounted to the body 120 over lens 136 and acts to evenly spread light emitted from the body 120 of indicator light 68 and to protect the lens 136. The fiber optic indicator light 68 acts to magnify light produced by the high intensity fiber optic transmitter 50 (FIG. 1) of interface module 12 which is transmitted through optical fiber 66-1 and emit this light through diffuser glass 140.

Returning to FIG. 1, if motor 16 is OFF and no button has been pressed, starter contacts 22, 38 and 42 are open (as is interface contact 40) and no current flows in the motor and starter circuit 10. However, DC current does flow in the interface module 12 through the current loop including parallel mounted transmitters 58a, 58b. This powers these optical transmitters such that light is directed along fibres 66-2 and 66-4. The long blade of the START pushbutton 72 blocks incoming light from fibre 66-4 so that no light reaches receiver 64b. In consequence relay 60b is not energized and contact 40 therefore remains open. In contrast, the shorter blade of the STOP pushbutton 70 allows light to pass to fibre 66-3. This light therefore passes to receiver 64a which outputs an electrical signal to relay 60a thereby energizing the relay. In consequence, the relay 60a keeps interface contact 36 closed. Now, if a user presses the START optical pushbutton 72, light transmitted by the optical transmitter 58b through fiber 66-4 which was hitherto blocked by the blade 113 (FIG. 6B) of plunger 112 (FIG. 6B), is now able to pass through the plunger aperture 115 (FIG. 6B) to the receiver fiber 66-5. The optical receiver 64b receives the light signal and energizes relay 60b through Schmitt trigger 62b. This causes the relay 60b to close its normally-open contact 40 which completes a circuit path allowing current to flow in the loop containing the overload contact 29, starter contactor 30, now closed contact 40, and closed contact 36. With the starter contactor 30 energised, it closes the starter contacts 22, 42, and 38. With starter contacts 22 closed, the primary motor 16 is energized. Further, the closing of starter contact 42 completes the circuit including transmitter 50. Transmitter 50, once energized, feeds visible light to optical fibre 66-1. Referencing FIG. 7, this light passes to indicator light 68, emerging from the end of fibre 66-1 at the focus of lens 136. The light is therefore magnified by the lens and strikes the diffuser plate 140 so that diffuse light emerges from the open end of the body 120 of indicator light 68 indicating the RUN status of the primary motor 16. Starter contact 38, when closed, by-passes contact 40. Therefore, the starter contact 38 acts as a seal-in contact, maintaining a complete circuit path through starter contactor 30 after the START pushbutton is released to cut power to relay 60b and open contact 40.

With motor 16 ON, pressing the STOP optical pushbutton 70 inserts blade 93 (FIG. 4) between fibres 66-2 and 66-3 thereby interrupting light transmitted to optical receiver 64b. The receiver therefore ceases energizing relay 60a so that contact 36 opens. This interrupts the circuit path through starter contactor 30. Consequently starter contacts 22, 42, and 38 open which shuts down primary motor 16. When the STOP button is released and interface contact 36 again closes, no current will flow in the motor and starter circuit 10 since the seal-in contact 38 is now open. Therefore, the motor and starter circuit 10 remains de-energized waiting for a new START command. Because the STOP relay 60a in normal state is energized, a fail-safe operation of the STOP circuit is ensured: if the electro-optic interface module loses power or becomes defective, or the fiber optic cable is accidentally cut, the motor 16 stops.

It will be apparent that the circuit path including starter contactor 30 may also be completed by depressing local start button 32 in order to energise the primary motor 16. And the circuit path including contactor 30 may be interrupted by depressing local stop button 34. This provides an alternate method of starting and stopping the primary motor. The local start and stop buttons are optional and are only advisable where they can be positioned in a non-hazardous area.

If overload relay 24 senses an overload current, it will open overload contact 29 which will result in de-energising the starter contactor 30 and, therefore, the primary motor 16.

The pushbutton control station 14 can be installed in hazardous areas without the need to be rated as explosion proof because there is no risk of the optical STOP and START pushbuttons 70, 72 or indicator light 68 producing sparks when actuated. Both the STOP and START pushbuttons 70, 72 and the fiber optic indicator light 68 have switch and fiber mounting elements which are metallic. These may be grounded through dedicated grounding conductors (not shown) to limit any build up of static electricity and so prevent static discharges from occurring.

Figure 6A:
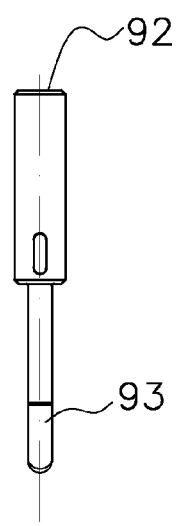
FIG. 6A is a side view of a plunger of the STOP pushbutton.
Figure 6B:
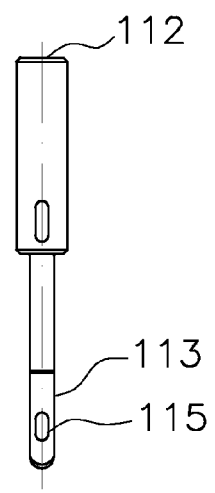
FIG. 6B is a side view of a plunger of a START pushbutton in accordance with an embodiment of the present invention.

As will be appreciated by those skilled in the art, the control circuit could be arranged so that the short bladed switch of FIG. 6A acts as a START switch rather than as a STOP switch and the long bladed switch of FIG. 6B acts as a STOP switch. This alternate arrangement might be achieved, for example, by interposing an inverter between the output of each of relays 60a, 60b and their respective contacts 40, 36. However, with this arrangement fail safe operation is not achieved.

Although aspects of the invention have been described in the context of a control circuit for starting and stopping a motor, it will be clear to one of ordinary skill in the art that the arrangement described can be adapted for electrical heater control, motorized valve control, lighting control and similar electrical circuits.

While specific arrangements of components have been described for convenience or expense, it is clear that different forms of fiber, such as plastic fiber, may be used. Alternatively, for long fiber spans between a controlled electrical circuit and a controlling optical circuit, light attenuation within the transmitter and receiver fibers can be reduced by using longer wavelength infra-red optical transmitters and receivers operating at or near a 1550 nanometer wavelength. Although not shown, the electro-optic interface module 12 can be formed as a sealed unit with plug and socket connector arrangements on the optical and electrical sides.

It will be clear to one of ordinary skill in the art that other variations are also possible without departing from the spirit of the invention. For example, the invention has been described in terms of an optical circuit because a controlling optical circuit is convenient and inexpensive. However, the risk of electric arcing can alternatively be reduced by using a hydraulic or pneumatic circuit as the controlling circuit. In such embodiments, actuation of operator controlled remote, non-electrical STOP and START pushbuttons functions to cause a pressure drop or increase in the hydraulic or pneumatic circuit. Pressure changes may be detected by pressure sensors occupying positions corresponding to the optical receivers of the optical embodiment described above. Valves connected to an hydraulic or pneumatic pump occupy positions corresponding to the light emitters of the optical embodiment described above. In a manner corresponding to that described above, the hydraulic or pneumatic sensors and valves are connected through a hydraulic-electrical or pneumatic-electrical interface to allow a similar remote STOP/START actuation of the controlled electrical circuit.

It will be apparent to those skilled in the art that the disclosed invention may be modified in numerous ways and may assume many embodiments other than the forms specifically set out and described above. Accordingly, it is intended by the appended claims to cover all modifications of the invention which fall within the true spirit and scope of the invention.

What is claimed is:

1. A control system for electrical apparatus, comprising:
an electro-optic interface having a first optical transmitter for producing an optical output signal in response to an electrical input signal, an optical receiver for producing an output electric signal in response to an optical input signal, and a second optical transmitter for producing an optical output signal in the visible range of light in response to an electric input signal;
a first optical path extending from said second optical transmitter to said optical receiver through a control module and a second optical path extending from said second optical transmitter to said control module,
said control module comprising a mechanical switch arranged for selectively interrupting said first optical path and a light magnifying lens terminating said second optical path.

2. The control system of claim 1 wherein said mechanical switch comprises a manually actuated plunger having a first position blocking said first optical path and a second position not blocking said first optical path.

3. The control system of claim 2 wherein said first optical path comprises a transmitter optical fibre extending between said first optical transmitter and said mechanical switch and a receiver optical fibre extending between said mechanical switch and said optical receiver.

4. The control system of claim 3 wherein said mechanical switch has a biasing element for biasing said plunger to one of said first position and said second position.

5. The control system of claim 3 wherein said mechanical switch comprises a pair of spaced ball lenses, one terminating each of said transmitter optical fibre and said receiver optical fibre and wherein said plunger, at least when in said first position, extends between said pair of spaced ball lenses.

6. The control system of claim 4 wherein said mechanical switch comprises a pair of spaced ball lenses, one terminating each of said transmitter optical fibre and said receiver optical fibre and wherein said plunger, at least when in said first position, extends between said pair of spaced ball lenses.

7. The control system of claim 6 wherein said optical receiver is a first optical receiver and said mechanical switch is a first mechanical switch, and wherein:
said electro-optic interface has a third optical transmitter for producing an optical output signal in response to an electric input signal and a second optical receiver for producing an output electric signal in response to an optical input signal;
a third optical path extending from said third optical transmitter to said second optical receiver through said control module;
said control module having a second mechanical switch arranged for selectively interrupting said third optical path.

8. The control system of claim 7 wherein said second mechanical switch comprises a manually actuated second plunger having a first position blocking said third optical path and a second position not blocking said third optical path.

9. The control system of claim 8 wherein said second mechanical switch has a biasing element for biasing said second plunger to one of said first position and said second position.

10. The control system of claim 9 wherein first mechanical switch is biased to a non-blocking position and said second mechanical switch is biased to a blocking position.

11. The control system of claim 10 wherein first optical receiver outputs to a first relay, said first relay controlling a first electrical contact and wherein said second optical receiver outputs to a second relay, said second relay controlling a second electrical contact.

12. The control system of claim 1 further comprising at least one optical fibre defining said first optical path and an optical fibre defining said second optical path.

* * * * *